United States Patent
Lutnick

(10) Patent No.: US 8,262,465 B2
(45) Date of Patent: Sep. 11, 2012

(54) PRODUCTS AND PROCESSES FOR A POINT EXCHANGE

(75) Inventor: Howard W. Lutnick, New York, NY (US)

(73) Assignee: CFPH, LLC, New York, NY (US)

( * ) Notice: Subject to any disclaimer, the term of this patent is extended or adjusted under 35 U.S.C. 154(b) by 1146 days.

(21) Appl. No.: 11/859,821

(22) Filed: Sep. 24, 2007

(65) Prior Publication Data
US 2009/0082091 A1  Mar. 26, 2009

(51) Int. Cl.
*A63F 9/24* (2006.01)
(52) U.S. Cl. .......................................................... 463/25
(58) Field of Classification Search ...................... 463/25
See application file for complete search history.

(56) References Cited

U.S. PATENT DOCUMENTS

| | | | |
|---|---|---|---|
| 5,275,400 A | 1/1994 | Weingardt et al. | |
| 5,769,714 A | 6/1998 | Wiener et al. | |
| 5,871,213 A | 2/1999 | Chadband et al. | |
| 6,126,543 A | 10/2000 | Friedman | |
| 6,152,822 A | 11/2000 | Herbert | |
| 6,929,264 B2 | 8/2005 | Huard et al. | |
| 7,351,149 B1 | 4/2008 | Simon et al. | |
| 7,590,602 B1 | 9/2009 | Luzzatto | |
| 7,682,239 B2 | 3/2010 | Friedman et al. | |
| 7,736,221 B2 | 6/2010 | Black et al. | |
| 7,740,539 B2 | 6/2010 | Simon | |
| 7,742,972 B2 | 6/2010 | Lange et al. | |
| 2001/0019965 A1 | 9/2001 | Ochi | |
| 2001/0054006 A1 | 12/2001 | Lee et al. | |
| 2002/0115488 A1 | 8/2002 | Berry et al. | |
| 2003/0069071 A1 | 4/2003 | Britt et al. | |
| 2003/0157976 A1* | 8/2003 | Simon et al. | 463/1 |
| 2004/0111358 A1 | 6/2004 | Lange et al. | |
| 2004/0204216 A1 | 10/2004 | Schugar | |
| 2005/0170883 A1 | 8/2005 | Muskin | |
| 2005/0192087 A1 | 9/2005 | Friedman et al. | |
| 2006/0258438 A1 | 11/2006 | Platis | |
| 2007/0087820 A1 | 4/2007 | Van Luchene et al. | |
| 2007/0129123 A1* | 6/2007 | Eryou et al. | 463/1 |
| 2008/0026816 A1 | 1/2008 | Sammon et al. | |
| 2008/0090632 A1 | 4/2008 | Kumar | |
| 2009/0082092 A1 | 3/2009 | Lutnick et al. | |
| 2009/0117989 A1 | 5/2009 | Arezina et al. | |
| 2009/0149244 A1 | 6/2009 | Lutnick | |
| 2009/0280892 A1 | 11/2009 | Lutnick et al. | |
| 2010/0135602 A1* | 6/2010 | Turvey et al. | 383/109 |

OTHER PUBLICATIONS

Notification of Transmittal or Search Report and Written Opinion of the ISA, or the Declaration, for International Application No. PCT/US07/79266; Sep. 19, 2008 (6 pages).

International Preliminary Report on Patentability for International Application No. PCT/US07/79266; Mar. 24, 2010 (4 pages).

Australian Examination Report for Application No. 2007359549, dated Nov. 5, 2010 (2 pages).

(Continued)

*Primary Examiner* — Pierre E Elisca

(57) ABSTRACT

Methods of tracking points among participants in various wagers. An indication of a wager may be received, including point distributions, participants, an event, etc. An indication of an outcome of the wager may be received. Points may be allocated among participants in accordance with a desired point distribution based on the outcome of the wager. An indication of a point adjustment may be received, and points may be adjusted accordingly. The point adjustment may be associated with an external exchange between participants in a wager. Other embodiments are disclosed.

23 Claims, 3 Drawing Sheets

OTHER PUBLICATIONS

USPTO Office Action for U.S. Appl. No. 11/859,828, Nov. 4, 2010 (13 pages).
U.S. Appl. No. 12/393,735, filed Feb. 26, 2009, Lutnick et al.
U.S. Appl. No. 11/859,828, filed Sep. 24, 2007, Lutnick.
U.S. Appl. No. 11/953,324, filed Dec. 10, 2007, Lutnick.
USPTO Office Action for U.S. Appl. No. 12/393,735, Jun. 23, 2011 (8 pages).
USPTO Office Action for U.S. Appl. No. 12/393,735, Feb. 29, 2012 (11 pages).
USPTO Office Action for U.S. Appl. No. 11/859,828, Apr. 21, 2011 (11 pages).
USPTO Office Action for U.S. Appl. No. 11/953,324, Sep. 8, 2011 (19 pages).
USPTO Interview Summary for U.S. Appl. No. 11/953,324, Dec. 19, 2011 (3 pages).
USPTO Office Action for U.S. Appl. No. 11/953,324, Mar. 22, 2012 (19 pages).
USPTO Notice of Allowance for U.S. Appl. No. 11/859,828, Mar. 20, 2012 (8 pages).

* cited by examiner

| PERSON1 | 50 |
| PERSON2 | 55 |
| PERSON3 | 0 |

201

| PERSON1 | 25, PERSON2; 25, GROUP1 |
| PERSON2 | 0 |
| PERSON3 | 20, GROUP2 |

203

| GROUP1 | PERSON1, PERSON2, PERSON3 |
| GROUP2 | PERSON1, PERSON3 |

PRODUCTS AND PROCESSES FOR A POINT EXCHANGE

BRIEF DESCRIPTION OF THE DRAWINGS

The accompanying drawings are not intended to be drawn to scale. In the drawings, each identical or similar component that is illustrated in various figures is represented by a like numeral. For purposes of clarity, not every component may be labeled or act identified in every drawing. In the drawings:

FIG. 2 shows example sets of database tables that may be maintained in some embodiments.

DETAILED DESCRIPTION

Terms

Figure 1:
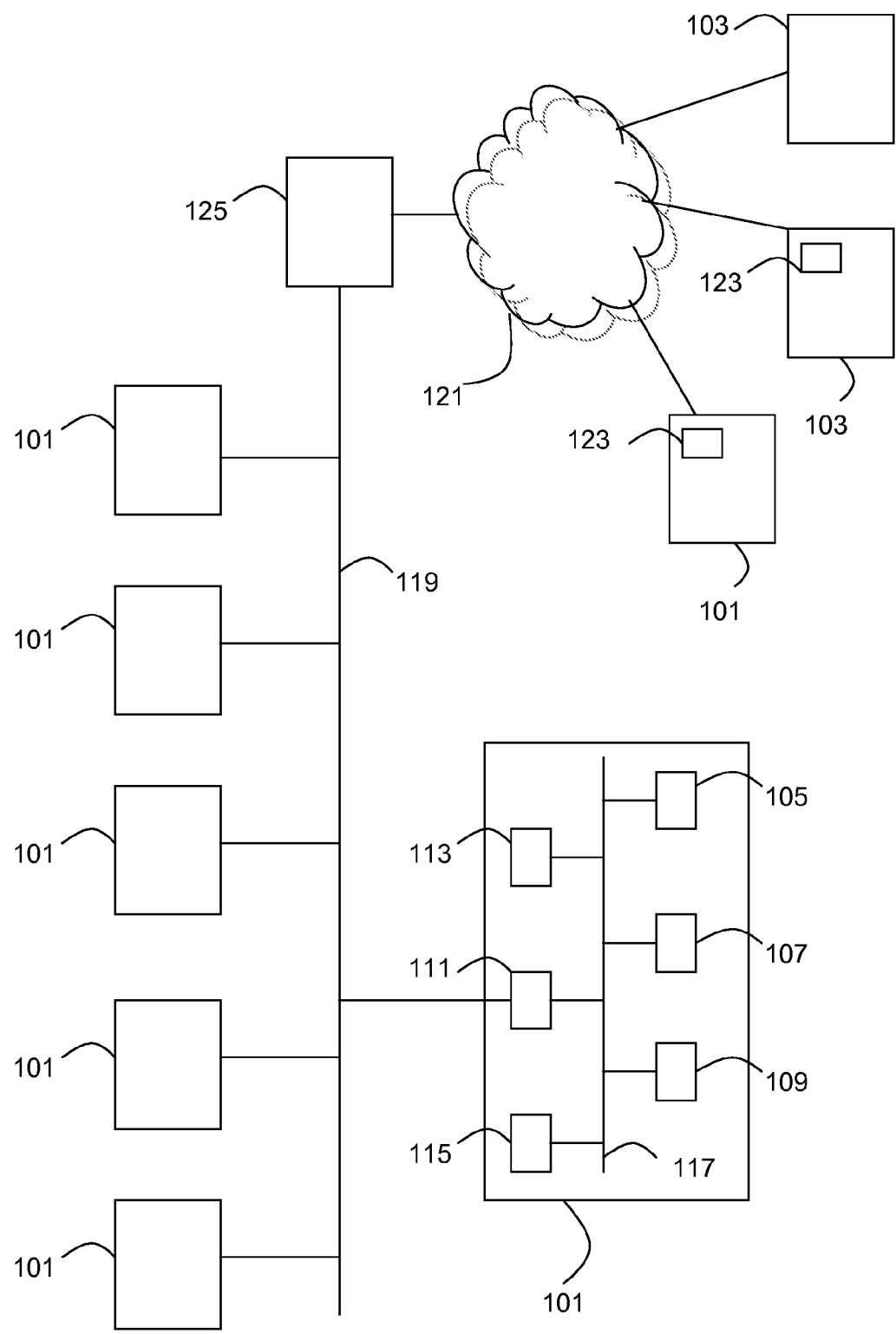
FIG. 1 shows a computer system architecture that may be used to perform one or more acts in accordance with some embodiments.

The term "product" means any machine, manufacture and/or composition of matter, unless expressly specified otherwise. The term "process" means any process, algorithm, method or the like, unless expressly specified otherwise. Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise. The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising", "having", "containing", "involving", and variations thereof mean "including but not limited to", unless expressly specified otherwise. The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". Similarly, the phrase "based on" does not mean "based on the entirety of", "based on all of", or variations thereon, unless expressly specified otherwise.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like. The term "determining" does not imply that mathematical processing must be performed, and does not imply that numerical methods must be used, and does not imply that an algorithm or process is used. The term "determining" does not imply that any particular device must be used. For example, a computer need not necessarily perform the determining.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the present invention", unless expressly specified otherwise.

The term "electronic message" and variations thereof used herein should be understood to mean any electronic representation of information. For example an HTTP message, an XMLHTTP request, an SMS message, an MMS message, a database message (e.g., SQL message) or any other series of electrical signals that represent information may be considered an electronic message. An electronic message may not include information identifying a source and/or destination such as the information typically present in a TCP/IP packet header. Rather, the electronic message may be considered to only include the body/content of such a packet.

The terms "representation" and "indication" of a thing and variations thereof used herein in reference to a thing should be understood to refer to any indication of at least a portion and/or characteristic of the thing. An indication of information, for example, may include any indication of at least a portion of the information. In some embodiments, the information may be determined by a person or computing device from the indication of the information. In some example implementations, an indication may include a copy of the information in any of a variety of formats, compressions, and/or encryptions. In another example implementation, an indication may include an index or other identifier, such as a position in a list, an ID number, or a database key. An indication of a thing may be in the same or different medium as an original thing. For example, a number "1" may indicate a sound, a color, a menu item, or any other thing depending, e.g., on the configuration of a computing system configured to interpret the number. In some implementations, an indication may be divided into a plurality of portions, such as a plurality of electronic messages being transmitted from one location to another. In some implementations, multiple indications may be combined into a single message.

When a limitation is claimed that includes performing any act on any information and/or any thing, such a limitation should be understood to include not only any action that performs the act on the information and/or thing, but also any action that performs the act on a portion of the information and/or thing and performs some other action or no action at all on another portion of the information and/or thing, unless explicitly specified otherwise. For example, a claim that includes limitations of freezing a dripping alimentary composition into beads, should be understood to include both a process in which all of a dripping alimentary compound is frozen into beads, and a process in which parts of a dripping alimentary compound are frozen into beads and parts of the dripping alimentary compound are not frozen into beads (e.g., they may be frozen into other non-bead shapes).

Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers (e.g., "a plurality of first widgets" indicates two or more widgets that are distinct from other widgets). For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples and Terminology Are Not Limiting

Neither the Title (set forth at the beginning of the first page of the present application) nor the Abstract (set forth at the end of the present application) is to be taken as limiting in any way to the scope of the present invention. An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are presented for illustrative purposes only. The described embodiments are not, and are not intended to be, limiting in any sense. One of ordinary skill in the art will recognize that the present invention may be practiced with various modifications and alterations, such as structural, logical, software, and electrical modifications. Although particular features of the present invention may be described with reference to one or more particular embodiments and/or drawings, it should be understood that such features are not limited to usage in the one or more particular embodiments or drawings with reference to which they are described, unless expressly specified otherwise.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g., weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention. Unless otherwise specified explicitly, no component/feature is essential or required.

Although process acts, algorithms or the like may be described in a particular sequential order, such processes may be configured to work in different orders. In other words, any sequence or order of acts that may be explicitly described does not necessarily indicate a requirement that the acts be performed in that order. The acts of processes described herein may be performed in any order. Further, some acts may be performed simultaneously despite being described or implied as occurring non-simultaneously (e.g., because one act is described after the other act). Further more, acts which are described as separate may be performed as a single act in some embodiments. Moreover, the illustration of a process by its depiction in a drawing does not imply that the illustrated process is exclusive of other variations and modifications thereto, does not imply that the illustrated process or any of its acts are necessary to the present invention, and does not imply that the illustrated process is preferred.

Although a process may be described as including a plurality of acts, that does not imply that all or any of the acts are preferred, essential or required. Various other embodiments within the scope of the present invention may include other processes that omit some or all of the described acts. Unless otherwise specified explicitly, no act is essential or required.

Although a process or product may be described singly or without reference to other processes or products, in some embodiments the process or product may interact with other processes or products. For example, such interaction may include linking one business model to another business model. Such interaction may be provided to enhance the flexibility or desirability of the process.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category. Also, an enumerated list of items (which may or may not be numbered) does not imply that any or all of the items are equivalent to each other or readily substituted for each other.

The preambles of the claims that follow recite purposes, benefits and possible uses of the claimed invention only and do not limit the claimed invention. The present disclosure is not a literal description of all embodiments of the invention(s). Also, the present disclosure is not a listing of features of the invention(s) which must be present in all embodiments.

Computing

It should be appreciated that the various processes described herein may be implemented by, e.g., appropriately programmed computer systems, e.g., general purpose computers 101 and/or computing devices 103, such as those illustrated in FIG. 1. A computing device 103 may include a specialized or general purpose computing device such as a cellular phone, a personal digital assistant, and/or any other portable or non-portable computing system that is not a general purpose computer. Some embodiments may include performing one or more acts involving a proprietary handheld score keeper device. Such a device may include a display screen through which a user interface may be provided and one or more input devices such as a keyboard and/or wireless or wired network interface through which information may be transmitted and/or received.

A "processor" 105 means one or more microprocessors, central processing units (CPUs), computing devices, microcontrollers, digital signal processors, application specific integrated circuits, or like devices or any combination thereof. A processor may include an Intel® Pentium®, Centrino®, and/or Core® processor. Typically, a processor 105 will receive instructions (e.g., from a memory or like device), and execute those instructions, thereby performing one or more processes defined by those instructions.

Thus a description of a process is likewise a description of an apparatus for performing the process. The apparatus that performs the process may include, e.g., a processor 105 and those input devices and/or output devices (e.g., a keyboard 107, mouse, trackball, microphone, touch screen, printing device, display screen 109, speaker, network interface 111) that are appropriate to perform the process.

Further, programs (i.e., collections of instructions) that implement such methods (as well as other types of data) may be stored and transmitted using a variety of media (e.g., machine-readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

In some embodiments, processor 105 may execute an operating system which may include, for example, the Windows-based operating systems (e.g., Windows NT, Windows 2000 (Windows ME), Windows XP, Windows Vista) available from the Microsoft Corporation, MAC OS System X operating system available from Apple, one or more of the Linux-based operating system distributions (e.g., the Enterprise Linux operating system available from Red Hat, Inc.), the Solaris operating system available from Sun Microsystems, or UNIX operating systems available from various sources. Many other operating systems may be used, and the invention is not limited to any particular operating system.

The processor and operating system together may define a computer platform for which programs stored on a machine-readable medium may be written in various programming languages, including an object-oriented programming language, such as SmallTalk, Java, C++, Ada, Python, or C# (C-Sharp), functional programming languages, scripting programming languages such as JavaScript, and/or logical programming languages. Various aspects may be implemented in a non-programmed environment (e.g., documents created in HTML, XML or other format that, when viewed in a window of a browser program, render aspects of a GUI or perform other functions). Some implementations may be implemented using a plurality of programming languages and techniques known collectively as AJAX to provide a user with an interactive web-based user interface.

Various embodiments may include a network environment including one or more computing systems (e.g., general purpose computers 101, other computing devices 103) in communication through one or more communication networks (e.g., a LAN 119, the Internet 121). The computer systems may communicate directly or indirectly, via any wired or wireless medium (e.g., the Internet 121, LAN 119, WAN or Ethernet, Token Ring, a telephone line, a cable line, a radio channel, an optical communications line, commercial on-line service providers, bulletin board systems, a satellite communications link, cellular telephone networks, a WI-FI network, a Bluetooth communication link, a combination of any of the above).

Various aspects (e.g., program elements stored on machine-readable media and executable by one or more processors) may be distributed among one or more computer systems configured to provide a service to one or more client computer systems. For example, in some embodiments, a plurality of computing systems may be organized as a central authority connected to a LAN or other communication network. These computing systems may receive requests and other information from remote computing systems through the Internet 121.

In some embodiments, one or more computer systems may act as one or more database servers. The database server may respond to database requests such as structured query language (SQL) queries by providing access to a database (e.g., searching of the database, writing to the database). The database server may maintain one or more database tables having information stored therein to facilitate the operation of some embodiments.

FIG. 2 illustrates example sets of database tables that may be used in some embodiments to track and/or adjust points, as described in more detail below. As illustrated, some embodiments may include a points table 201. The points table may store information regarding a distribution of points among a plurality of individuals. For example, as indicated in table 201 PERSON1 has been allocated 50 points, PERSON2 has been allocated 55 points, and PERSON3 has been allocated 0 points. People may be added and/or removed by adding and/or removing table rows, respectively. Points allocated to one or more people may be adjusted by changing (e.g., adding or subtracting) a value to one or more point values in an appropriate entry of the points column. A table such as table 201 may be useful, for example, to track points among a group of individuals that share a common point pool (e.g., people in a common participant group). For example, PERSON1, PERSON2, and PERSON3 may agree that points may be assigned and adjusted among all three of them together. PERSON1, PERSON2, and PERSON3 may for example be friends, co-workers, acquaintances or otherwise associated. PERSON1, PERSON2, and PERSON3 may be participants in a single wager or a common group of wagers. PERSON1, PERSON2, and PERSON3 may agree to be in a grouping before being placed in such a grouping. Some embodiments may include a table such as table 201 for each such grouping of people.

Some embodiments may include one or more database tables such as point table 203 and group table 205. Point table 203, similar to point table 201 may maintain point allocations among a plurality of people. However, point table 203 may track points among a plurality of groups by tuples that indicate one or more people or groups in the points column. For example, PERSON1 has been allocated 25 points from PERSON2 and 25 points from the group of people defined by the identifier GROUP1. Group table 205 may define one or more groups of people. A group identifier may be indicated in the groups column and a list of people in the group identified may be indicated in the people column. For example, GROUP1 includes PERSON1, PERSON2, and PERSON3 in the illustrated group table 205. Points associated with a particular group or a particular tuple of people may be considered a set of points.

It should be recognized that the sets of database tables of FIG. 2 are given as examples only, and that other embodiments may include any desired set of database tables or no database tables at all. For example, in some implementations, one or more database table may store personal information such as identification information, login information, and/or any other desired information.

Aside from database servers, in some embodiments, one or more computer systems may act as a web server. A web server may be configured to respond to network requests (e.g., HTTP messages, XMLHTTP requests) from web browsers executed by remote computer systems. For example, a web browser 123 executed by a computing system may direct an HTTP message through the Internet 121 to an edge routing device 125 connected to the LAN 119. The edge routing device 125 may be configured to direct the HTTP message to the web server through the LAN 119. The web server may provide a response (e.g., an HTML document) to the web browser 123 through the edge routing device 125 and Internet 121. The web server may be configured to communicate with other computer systems (e.g., a database server) to generate responses to such a received request.

In some embodiments, a server computer/centralized authority may not be necessary or desirable. For example, an embodiment may be practiced on one or more computing devices without a central authority. In such an embodiment, any functions described herein as performed by a server or data described as stored on a general purpose computer may instead be performed by or stored on one or more such computing devices.

The term "machine-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks 113 and other persistent memory. Volatile media include dynamic random access memory 115 (DRAM), which typically constitutes the main memory of a computer system. Transmission media include coaxial cables, copper wire and fiber optics, including the wires that comprise a system bus 117 coupled to the processor. Transmission media may include or convey acoustic waves, light waves and electromagnetic emissions, such as those generated during radio frequency (RF) and infrared (IR) data communications. Common forms of machine-readable media include, for example, a floppy disk, a flexible disk, a hard disk, a magnetic tape, any other magnetic medium, a CD-ROM, a DVD, any other optical medium, punch cards, a paper tape, any other physical medium with patterns of holes, a RAM, a PROM, an EPROM, a FLASH-EEPROM, any other memory chip or cartridge, a carrier wave, or any other medium from which a computer system can read.

Various forms of machine-readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a machine-readable medium storing a program for performing the process. The machine-readable medium can store (in any appropriate format) those program elements that are appropriate to perform the process.

Where a process is described, in some embodiments the process may operate without any user intervention. In other embodiments, the process includes some human intervention (e.g., an act is performed by or with the assistance of a human).

Just as the description of various acts in a process does not indicate that all the described acts are required, embodiments of an apparatus may include one or more computer systems operable to perform some (but not necessarily all) of the described process.

Likewise, just as the description of various acts in a process does not indicate that all the described acts are required, embodiments of a machine-readable medium storing a program or data structure include a machine-readable medium storing a program that, when executed, can cause one or more processors to perform some (but not necessarily all) of the described process.

Where databases are described, it will be understood by one of ordinary skill in the art that (i) alternative database structures to those described may be readily employed, and (ii) other memory structures besides databases may be readily employed. Any descriptions of any sample databases presented herein are illustrative arrangements for stored representations of information. Any number of other arrangements may be employed besides those suggested herein. Further, any database format (including relational databases, object-based models and/or distributed databases) may be used to store and manipulate the data types described herein. Likewise, object methods or behaviors of a database may be used to implement processes described herein. In addition, the databases may, in a known or other manner, be stored locally or remotely from a device which accesses data in such a database.

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

35 U.S.C. §112, Paragraph 6

In a claim, a limitation of the claim which includes the phrase "means for" or the phrase "step for" means that 35 U.S.C. §112, paragraph 6, applies to that limitation. In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function. Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

Incorporation by Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Exemplary Embodiments Various embodiments disclosed herein relate to tracking points allocated among one or more people. In some embodiments, for example, a group of people may enter into a wager. One or more winners of the wager may be allocated a number of points associated with the wager. Points may be adjusted later because of future wagers as well as non-wager events. Such embodiments may provide convenient and efficient ways of tracking both wager related and non-wager related information.

Figure 3:
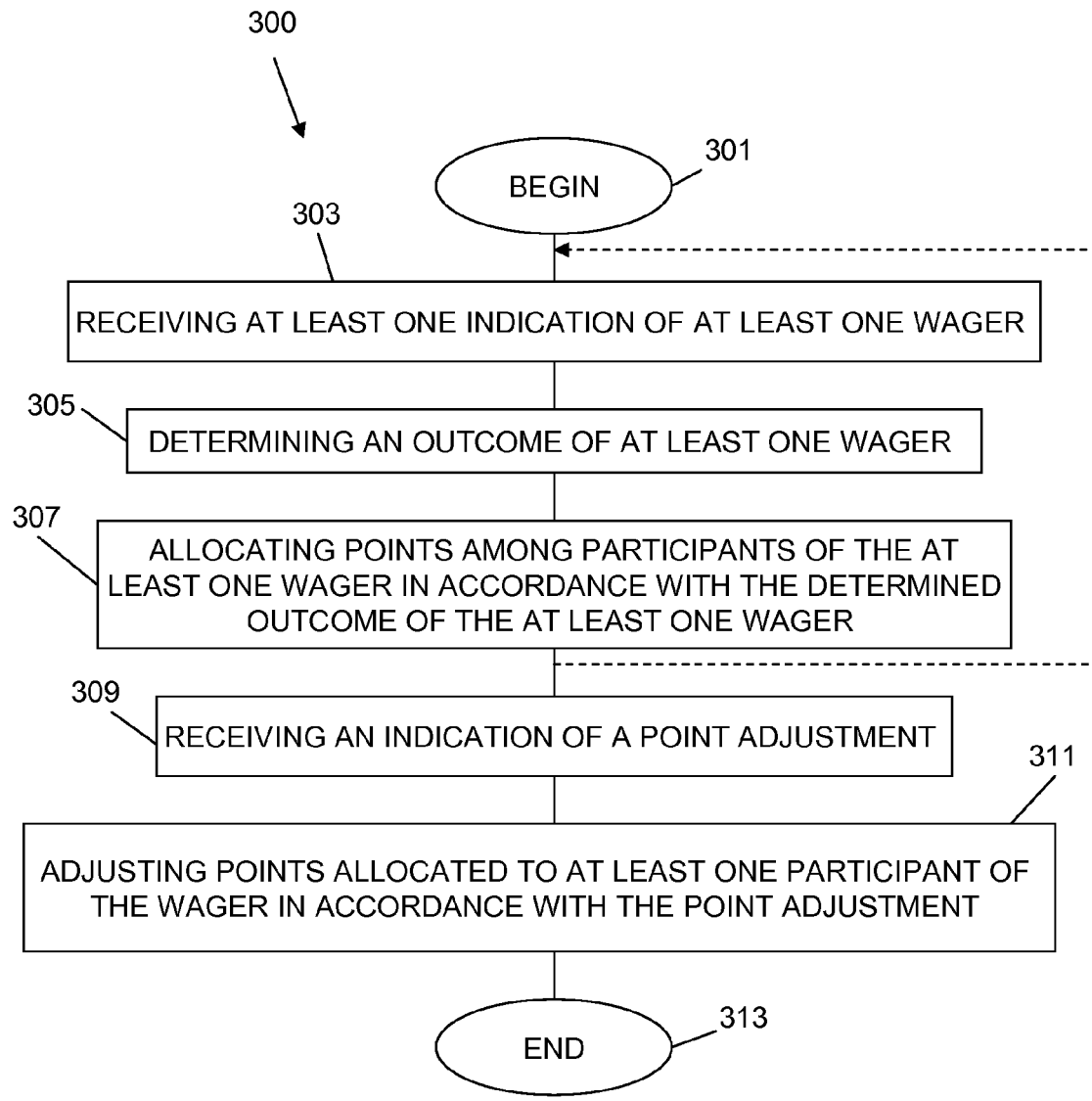
FIG. 3 shows an example process that may be performed by some embodiments.

FIG. 3 illustrates an example process 300 that may be performed by some embodiments. Process 300 may be used to adjust at least one first amount of points associated with a plurality of participants in a wager based on the outcome of the wager, and to adjust at least one second amount of points associated with the plurality of participants based, at least in part, on some external exchange or other event between at least two of the plurality of participants. In some implementations, one or more computer systems may perform one or more acts of process 300. Process 300 may begin at block 301.

Although not indicated in FIG. 3, some embodiments may include receiving information about one or more individuals and/or groups. Such information may include names, grouping information and/or other desired information. Such information may be used, for example, to create one or more database entries that allow a user and/or a group of users to be tracked. In some implementations, a user interface, such as a web page or mobile device interface may be provided through which a user may enter such information. In some embodiments, one or more users may identify themselves and or their inclusion as part of a group through such an interface, for example. In some implementations, one or more other users, e.g., other members of a group, may be asked to approve a new user before he or she is added to a particular group.

In some implementations, users may be identified to each other when participating in a wager together. For example, when playing an online card game, each user may be identified by a name through a user interface, so that users may know against whom they are playing even if they are not in the same location. In some implementations, users may not be identified to each other. Rather, users may be able to enter wagers (e.g., play a card game) anonymously. In some implementations, a user may be able to choose whether he or she is identified or not identified. In some implementations, users may be restricted to entering into wagers with people in their group so that even though during the wager (e.g., during the card game) one or more participants may be anonymous, users may be assured that all participants are in some why known or otherwise related to each other.

As indicated at block 303, process 300 may include receiving at least one indication of at least one wager. The wager may be associated with an amount of points wagered and an event. The event may include, for example, an outcome of a competition (e.g., a sport game, a virtual reality competition, a contest, an election, etc.), an outcome of a game (e.g., a card game, a slot machine pull, a die roll, fantasy sporting, etc.), an occurrence of a possible happening or fact (e.g., a random number generation, a phone call, a stock market change, meeting exercise goals, side bets on a game or competition, number of wins in a single player game, a persons weight, a correct answer to a question, etc.), a decision by one or more trusted sources or judges (e.g., a court case outcome, determined looks of a significant other, etc.), and/or any other desire event. Wagers may include fixed odds bets, spread bets, and/or any other bets.

In some embodiments, a wager may be "internal" to an embodiment. For example, an internal wager may include a wager that has an outcome that is largely facilitated by the embodiment. For example, a web page may both track points in accordance with some embodiments and facilitate an interactive card game through which participants may wager points based on the outcome of the game. In various implementations, a card game may include any game that may require a house or not require a house. In some implementations, if a card game requires a house, one or more participants may be determined to act as a house, the house may be rotated among the participants so that each acts as the house in turn on consecutive hands, and/or any other method of providing a house may be used.

In some embodiments, a wager may be "external" to an embodiment. For example, an external wager may include a wager that has an outcome that is largely not facilitated by the embodiment. For example, two participants may wager an amount of points on the outcome of a golf game played between the two participants and/or any other physical event.

In some embodiments, wagers may be limited to members of a group. By limiting participants of a wager to members of a group, the participants in the wager may be assured that they know or are in some way related to each participant in the wager. In some implementations, one or more members of a group may sponsor a third party to participate in a wager so that if the third party wins or loses, the sponsoring member may receive the benefit of wins and the detriment of loses.

Some embodiments may include providing a user interface, such as a web page or mobile device interface, through which information about the wager may be entered. Such information may include information identifying an amount of points wagered, information identifying participants in the wager, information identifying a point distribution to one or more winners of the wager, information identifying an event and/or any other desired information. Such an interface may present a representation of ongoing and/or available wagers (e.g., games) and/or allow a user to enter into/create custom wagers between users in a group. In some implementations, when a wager is created, a similar wager may become available to other users in other groups and/or other users in the same group. Such implementations, allows users from various groups to define wagers for other groups. In some implementations, a ranking or positioning in a user interface of a wager defined by one group may be determined by a number of other groups that have entered into that wager. So, for example, a popular wager defined by one group may be positioned in a more prominent location than an unpopular wager defined by another group when an interface presents a listing of current wagers.

In some embodiments, a user interface may be provided that includes a gaming interface (e.g., online card game, etc.) through which a game is played and bets associated with the game (i.e., wagers) are placed. In some implementations, such a game may include a game of skill and/or a game of chance. In some implementations, some or all points wagered may be limited to one or more default values (e.g., antes). In some implementations, some or all points wagered may be adjustable (e.g., raises).

Although not indicated in FIG. 2, some implementations may include receiving an acceptance of a wager. For example, a first participant in a wager may transmit an indication that a wager has been created to an embodiment, and/or an indication of an offer for a wager (e.g., a raise in a poker game). A second participant may later transmit an acceptance of the created wager or of the offered wager.

As indicated at block 305, process 300 may include determining an outcome of at least one wager. Determining the outcome of the wager may include determining an outcome of the event associated with the wager. In some implementations, such a determination may include determining the outcome of an internal wager, such as determining the winner of on online card game. In some implementations, such a determination may include determining the outcome of an external wager, such as determining the winner of a golf game. Determining the outcome of an external wager may include, for example, receiving an indication of the outcome of the external wager, e.g., from a participant in the external wager, from a judge of the external wager, from a trusted source (e.g., a sports reporter reporting sport bracket results), etc. A user interface may be provided in some implementations that may allow entry of such information.

As indicated at block 307, process 300 may include allocating points among participants of the at least one wager in accordance with the determined outcome of the at least one wager. Allocating points may include, for example, adjusting a point value stored on a machine readable medium, e.g., in one or more database tables, and associated with one or more of the participants. Allocating points may include providing points to one or more participants in the wager who are determined to be winners of the wager, e.g., at block 305 of process 300. The number of points provided may be determined based on information identifying a point distribution associated with the wager, e.g., at block 303 of process 300, and/or a default point distribution, e.g., all points to winner none to others.

In some implementations, process 300 may loop to block 303 after completion of block 307. By so looping, multiple wagers affecting multiple different or similar participants may be completed and points may be adjusted accordingly.

As indicated at block 309, process 300 may include receiving an indication of a point adjustment. The indication of the point adjustment may include, for example, an indication that an external event, such as an exchange of goods, services, money, etc., has occurred. The indication may also be an indication of a correction to a prior error in point distribution. The indication may identify a participant in the wager and an amount of points to change. In some implementations, the indication of the adjustment may be received from one or more participants in the wager or users associated with a group. In some implementations, a user interface, e.g., a web page or mobile device interface, may be provided through which a point adjustment may be entered by the one or more users.

The point adjustment may include a negative point adjustment, which may be particularly useful to account for an external exchange of goods, services, and/or money. The point adjustment may include a positive point adjustment, which may be particularly useful, for example, when a participant desires to concede a wager, transfer points to another member of a group, correct a point tracking error, and/or otherwise increase points of a user.

As indicated at block 311, process 300 may include adjusting points allocated to at least one participant of the wager in accordance with the point adjustment. An embodiment may adjust points associated with the identified participant in response to receiving the indication of the point adjustment, for example, by changing a point value stored on one or more machine readable medium, e.g., in one or more database tables. In some implementations, an adjustment may be performed after it is verified by all or some number of participants in a wager or members of a group. Some implementations may transmit a verification request to some participants, e.g., through email, through another user interface, etc. In some embodiments, a historic point value may also be maintained. Such a historic point value may represent a history of wins and losses among a group of participants without taking into account adjustments from external exchanges or other events. In some implementations, when submitting a request for a point adjustment, a user may indicate whether the point adjustment should affect the historic point value. This may be useful for example so that points added, for example, due to a concession or subtracted due to prior errors are adjusted in the historic point value, but points subtracted, for example, due to an exchange of goods or services are not reflected.

In some implementations, a mechanism for verifying point adjustments may be used. For example, a message may be transmitted to users of a group requesting that they accept a point adjustment before the point adjustment is made. In some implementations, codes may be used to authenticate that point adjustments are valid. For example, a user may submit a verifying code when submitting a request to alter points. Such a verifying code may be provided by another user (e.g., other group members) to signify that the user is allowed to make the point adjustment. Any mechanisms of generating and providing such codes to users may be used. For example, the codes may be single use codes generated each time a user wants to authorize another user to make a point adjustment, the codes may be reuseable codes associated with a particular user (such as a PGP public key), or any other desired type of code may be used.

Process 300 may end at block 313. Process 300 may also loop back to either block 309 for further point adjustments or block 303 for further wagers.

Although not indicated in FIG. 3, process 300 may include providing a representation of points allocated to one or more users. The representation may include, for example a user interface such as a web page or mobile device interface that displays points allocated to a particular participant or participant group. Such ha representation may be provided at any time during process 300, such as before/after an indication of a wager is received, before/after an indication of a point adjustment is received, and/or at any other time.

Also not indicated in FIG. 3, process 300 may include providing messaging functionality through one or more computer systems. Participants in a wager or in a group may interact with each other through private messages, forums, community chat, and/or any other method. For example, in one implementations, a first participant may send a message to a second participant saying "I am beating you." Such messaging functionality may be facilitated using, for example, known methods such as email, SMS or MMS messaging, instant messaging technology, and/or any other new or known technology.

It should be understood that process 300 and any other actions described above are given as examples only. Other embodiments may include additional and/or alternative actions in any order.

An example iteration through process 300 may involve, for example, a group of friends or other acquaintances. The group of individuals may identify themselves to an embodiment, for example through separate web page interfaces accessed by respective individuals using respective web browsers. The group may access an interface through which wagers may be entered, for example an online poker room accessed through separate web browsers. The individuals may play one or more games through the interfaces, for example, one or more hands of poker. Each game may include one or more bets of some number of points, for example, an ante and raises in each poker game. The winner of each game may be determined and allocated the bet of the number of points for each game, for example, the winner of each hand of poker may be allocated the number of points anted and raises matched for that hand.

After playing some number of games, the group may finish playing. Outside of the interface, one or more exchanges may occur. For example, one member of the group may purchase food for other members of the group, exchange money with other members of the group, perform a desired service for other members of the group, etc. In response to this exchange, the members of the group may access the user interface and submit information indicating that points should be adjusted to reflect some agreed upon change in points. An embodiment may verify this adjustment with each member of the group before making the adjustment.

More Embodiments

A method comprising receiving a plurality of indications, each respective indication of the plurality of indications indicating a respective wager of a plurality of wagers, each respective wager including a respective event, a respective amount of points wagered, and at least one respective participant; based, at least in part, on outcomes of the respective events, determining a distribution of points among participants of the plurality of wagers; receiving at least one indication of a point adjustment; and adjusting points allocated to at least one participant of the plurality of wagers based, at least in part, on the point adjustment.

The method further comprising allocating the points in accordance with the distribution of points.

The method in which allocating includes storing information about the points on at least one machine readable medium.

The method in which adjusting includes at least one of an addition and a subtraction of points associated with the at least one participant.

The method in which at least one wager of the plurality of wagers includes a distribution plan that indicates how points should be distributed among at least one winner of the at least one wager.

The method in which determining the distribution of points among the participants of the plurality of wagers includes determining the distribution of points among the participants of the plurality of wagers based at least in part on the distribution plan.

The method in which the plurality of indications are each received from at least one respective participant.

The method further comprising receiving at least one acceptance of a respective wager of the plurality of wagers from at least one second participant of the respective wager.

The method further comprising providing at least one user interface.

The method in which the at least one user interface includes at least one of an interface through which information regarding at least one of the plurality of wagers may be entered, an interface through which at least one game associated with at least one wager may be played, an interface through which information regarding the at least one point adjustment may be entered, and an interface through which a representation of a current point distribution may be viewed.

The method further comprising presenting at least one representation of a current point distribution.

The method in which at least one respective event includes at least one of an outcome of a game, an outcome of a competition, an occurrence of a possible happening, and a decision.

The method in which the game includes at least one of a game of chance and a game of skill.

The method further comprising receiving information regarding at least one participant in at least one wager of the plurality of wagers.

The method in which the information includes at least one of identification information, and information identifying a group of associated participants.

The method further comprising determining the outcomes of the respective events.

The method in which determining the outcomes includes receiving an indication of the outcomes.

The method in which the at least one indication of the point adjustment includes an indication that an event occurred.

The method in which the at least one indication of the point adjustment includes an indication of an exchange between at least two respective participants.

The method in which the exchange includes at least one of an exchange of goods, an exchange of services, and an exchange of money.

The method in which the point adjustment includes a decrease in points distributed to a first one of the at least two respective participants.

The method further comprising, verifying the point adjustment with at least one of the participants.

An apparatus comprising at least one machine readable medium, the at least one machine readable medium having stored thereon a plurality of machine instructions, the plurality of machine instructions together being able to control at least one computer system to perform.

The apparatus further comprising at least one processor configured to execute at least one instruction of the plurality of machine instructions.

A method comprising receiving an indication of a wager, the wager including an event, an amount of points wagered, and at least two participants; based, at least in part, on an outcome of the event, allocating at least a portion of the amount of points wagered between the at least two participants; receiving at least one indication of a point adjustment; and adjusting points allocated to at least one of the at least two participants based, at least in part, on the point adjustment.

The method in which allocating includes storing information about the points on at least one machine readable medium.

The method in which adjusting includes at least one of an addition and a subtraction of points associated with the at least one participant.

The method in which the wager includes a distribution plan that indicates how points should be distributed among at least one winner of the wager.

The method in which allocating includes determining a distribution of points among the at least two participants based at least in part on the distribution plan.

The method in which the indication of the wager is received from at least one respective participant of the at least two participants.

The method further comprising receiving at least one acceptance of the wager from at least one second participant of the at least two participants.

The method further comprising providing at least one user interface.

The method in which the at least one user interface includes at least one of an interface through which information regarding the wager may be entered, an interface through which at least one game associated with the wager may be played, an interface through which information regarding the point adjustment may be entered, and an interface through which a representation of a current point distribution may be viewed.

The method further comprising presenting at least one representation of a current point distribution.

The method in which the event includes at least one of an outcome of a game, an outcome of a competition, an occurrence of a possible happening, and a decision.

The method in which the game includes at least one of a game of chance and a game of skill.

The method further comprising receiving information regarding at least one participant of the at least two participants.

The method in which the information includes at least one of identification information, and information identifying a group of associated participants.

The method further comprising determining the outcome of the event.

The method in which determining the outcome includes receiving an indication of the outcome.

The method in which the at least one indication of the point adjustment includes an indication that an event occurred.

The method in which the at least one indication of the point adjustment includes an indication of an exchange between at least two respective participants of the at least two participants.

The method in which the exchange includes at least one of an exchange of goods, an exchange of services, and an exchange of money.

The method in which the point adjustment includes a decrease in points distributed to a first one of the at least two respective participants.

The method further comprising, verifying the point adjustment with at least one of the participants.

An apparatus comprising at least one machine readable medium, the at least one machine readable medium having stored thereon a plurality of machine instructions, the plurality of machine instructions together being able to control at least one computer system to perform.

The apparatus further comprising at least one processor configured to execute at least one instruction of the plurality of machine instructions.

A method comprising adjusting at least one first amount of points of a set of amounts of points associated with a plurality of participants, based, at least in part, on at least one outcome of at least one wager involving at least a portion of the plurality of participants; and adjusting at least one second amount of points of the set of amounts of points based, at least in part, on at least one exchange between at least two of the plurality of participants.

The method in which adjusting the at least one first amount of points includes storing information about the set of amounts of points on at least one machine readable medium.

The method in which adjusting the at least one second amount of points includes storing information about the set of amounts of points on at least one machine readable medium.

The method in which adjusting the at least one second amount of points includes at least one of an addition and a subtraction.

The method in which the at least one wager includes a distribution plan that indicates how points should be distributed among at least one winner of the at least one wager.

The method in which adjusting the at least one first amount of points includes adjusting the at least one first amount of points based at least in part on the distribution plan.

The method further comprising, receiving at least one indication of the at least one wager.

The method in which the indication of the wager is received from at least one of the plurality of participants.

The method further comprising providing at least one user interface.

The method in which the at least one user interface includes at least one of an interface through which information regarding the at least one wager may be entered, an interface through which at least one game associated with the at least one wager may be played, an interface through which information regarding the at lest one exchange may be entered, and an interface through which a representation of a current point distribution may be viewed.

The method further comprising presenting at least one representation of a current point distribution.

The method in which the event includes at least one of an outcome of a game, an outcome of a competition, an occurrence of a possible happening, and a decision.

The method in which the game includes at least one of a game of chance and a game of skill.

The method further comprising receiving information regarding at least one participant of the plurality of participants.

The method in which the information includes at least one of identification information, and information identifying a group, the group comprising the plurality of participants.

The method further comprising determining the outcome of the at least one wager.

The method in which determining the outcome includes receiving an indication of the outcome.

The method in which the exchange includes at least one of an exchange of goods, an exchange of services, and an exchange of money.

The method further comprising, verifying an occurrence of the exchange with at least one of the participants.

The method in which the at least one first amount of points includes the at least one second amount of points.

An apparatus comprising at least one machine readable medium, the at least one machine readable medium having stored thereon a plurality of machine instructions, the plurality of machine instructions together being able to control at least one computer system to perform.

The apparatus further comprising at least one processor configured to execute at least one instruction of the plurality of machine instructions.

The invention claimed is:

1. A method comprising:
receiving, by a processor, a plurality of indications, each respective indication of the plurality of indications indicating a respective wager of a plurality of wagers, each respective wager including a respective event, a respective amount of points wagered, and at least one respective participant;
based, at least in part, on outcomes of the respective events, determining, by the processor, a distribution of points among participants of the plurality of wagers;
receiving, by the processor, at least one indication of a point adjustment, wherein the at least one indication of a point adjustment is not related to the wager, and wherein the at least one indication of a point adjustment is not related to the event; and
adjusting, by the processor, points allocated to at least one participant of the plurality of wagers based, at least in part, on:
the distribution of points among participants of the plurality of wagers, and the point adjustment.

2. The method of claim 1, further comprising allocating, by the processor, the points in accordance with the distribution of points.

3. The method of claim 1, in which adjusting includes at least one of an addition and a subtraction of points associated with the at least one participant.

4. The method of claim 1, in which at least one wager of the plurality of wagers includes a distribution plan that indicates how points should be distributed among at least one winner of the at least one wager.

5. The method of claim 4, in which determining the distribution of points among the participants of the plurality of wagers includes determining, by the processor, the distribution of points among the participants of the plurality of wagers based at least in part on the distribution plan.

6. The method of claim 1, in which each of the plurality of indications is received from at least one respective participant.

7. The method of claim 6, further comprising receiving, by the processor, at least one acceptance of a respective wager of the plurality of wagers from at least one second participant of the respective wager.

8. The method of claim 1, further comprising providing, by the processor, at least one user interface.

9. The method of claim 8, in which the at least one user interface includes at least one of:
an interface through which information regarding at least one of the plurality of wagers is entered,
an interface through which at least one game associated with at least one wager is played,
an interface through which information regarding the at least one point adjustment is entered, and
an interface through which a representation of a current point distribution is viewed.

10. The method of claim 1, further comprising presenting, by the processor, at least one representation of a current point distribution.

11. The method of claim 1, in which at least one respective event includes at least one of an outcome of a game, an outcome of a competition, an occurrence of a possible happening, and a decision.

12. The method of claim 11, in which the game includes at least one of a game of chance and a game of skill.

13. The method of claim 1, further comprising receiving, by the processor, information regarding at least one participant in at least one wager of the plurality of wagers.

14. The method of claim 13, in which the information includes at least one of identification information, and information identifying a group of associated participants.

15. The method of claim 1, further comprising determining, by the processor, the outcomes of the respective events.

16. The method of claim 15, in which determining the outcomes includes receiving an indication of the outcomes.

17. The method of claim 1, in which the at least one indication of the point adjustment includes an indication that an event occurred.

18. The method of claim 1, in which the at least one indication of the point adjustment includes an indication of an exchange between at least two respective participants.

19. The method of claim 18, in which the exchange includes at least one of an exchange of goods, an exchange of services, and an exchange of money.

20. The method of claim 19, in which the point adjustment includes a decrease in points distributed to a first one of the at least two respective participants.

21. The method of claim 1, further comprising verifying, by the processor, the point adjustment with at least one of the participants.

22. An apparatus comprising:
at least one non-transitory machine readable medium, the at least one non-transitory machine readable medium having stored thereon a plurality of machine instructions, the plurality of machine instructions, when executed by at least one computer system, together being able to direct the at least one computer system to:
receive a plurality of indications, each respective indication of the plurality of indications indicating a respective wager of a plurality of wagers, each respective wager including a respective event, a respective amount of points wagered, and at least one respective participant;
based, at least in part, on outcomes of the respective events, determine a distribution of points among participants of the plurality of wagers;
receive at least one indication of a point adjustment, wherein the at least one indication of a point adjustment is not related to the wager, and wherein the at least one indication of a point adjustment is not related to the event; and
adjust points allocated to at least one participant of the plurality of wagers based, at least in part, on:
the distribution of points among participants of the plurality of wagers, and the point adjustment.

23. The apparatus of claim 22, further comprising:
at least one processor configured to execute at least one instruction of the plurality of machine instructions.

* * * * *